US009967777B2

(12) United States Patent
Savolainen (10) Patent No.: US 9,967,777 B2
(45) Date of Patent: May 8, 2018

(54) PROCESSOR SLEEP MODE COMMUNICATION HANDLING (71) Applicant: Nokia Technologies Oy, Espoo (FI)

(72) Inventor: Teemu Ilmari Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 14/900,278

(22) PCT Filed: Jul. 11, 2013

(86) PCT No.: PCT/IB2013/055711
§ 371 (c)(1),
(2) Date: Dec. 21, 2015

(87) PCT Pub. No.: WO2015/004506
PCT Pub. Date: Jan. 15, 2015

(65) Prior Publication Data
US 2016/0205594 A1    Jul. 14, 2016

(51) Int. Cl.
H04W 28/12 (2009.01)
H04W 52/02 (2009.01)

(52) U.S. Cl.
CPC ........... *H04W 28/12* (2013.01); *H04W 52/02* (2013.01); *H04W 52/0251* (2013.01)

(58) Field of Classification Search
None
See application file for complete search history.

(56) References Cited

U.S. PATENT DOCUMENTS

| 8,326,372 | B2 * | 12/2012 | Raissinia | H04W 52/0216 370/311 |
| 8,855,033 | B2 * | 10/2014 | Kim | H04W 52/0229 370/311 |
| 2003/0012149 | A1 | 1/2003 | Maggenti et al. | |
| 2004/0218556 | A1 * | 11/2004 | Son | H04W 52/0225 370/311 |
| 2005/0091331 | A1 * | 4/2005 | Brown | H04L 12/12 709/208 |
| 2006/0199621 | A1 * | 9/2006 | Stirbu | H04L 69/161 455/574 |
| 2007/0140199 | A1 | 6/2007 | Zhao et al. | |

(Continued)

FOREIGN PATENT DOCUMENTS

EP   1724684 A1   11/2006

OTHER PUBLICATIONS

International Search Report and Written Opinion received for corresponding Patent Cooperation Treaty Application No. PCT/IB2013/055711, dated Mar. 19, 2014, 8 pages.

(Continued)

*Primary Examiner* — Hicham Foud
(74) *Attorney, Agent, or Firm* — Mintz Levin Cohn Ferris Glovsky and Popeo, P.C.

(57) ABSTRACT

A method including determining when a processor of an apparatus is in a sleep mode; when the processor is determined to be in the sleep mode, and during a transport protocol session of the apparatus with a device, preventing an incoming transport packet of the transport protocol session from disturbing the sleep mode of the processor; and in response to the incoming transport packet, while the processor is in the sleep mode, transmitting an indication by the apparatus to the device.

16 Claims, 5 Drawing Sheets

(56) References Cited

U.S. PATENT DOCUMENTS

| | | | | |
|---|---|---|---|---|
| 2007/0218938 A1* | 9/2007 | Carter | | H04W 52/0251 |
| | | | | 455/528 |
| 2007/0238437 A1 | 10/2007 | Jaakkola | | |
| 2008/0267214 A1 | 10/2008 | Jaakkola | | |
| 2008/0307093 A1* | 12/2008 | Song | | H04L 12/12 |
| | | | | 709/226 |
| 2009/0124301 A1* | 5/2009 | Raissinia | | H04W 52/0216 |
| | | | | 455/574 |
| 2010/0083026 A1* | 4/2010 | Millet | | G06F 1/3209 |
| | | | | 713/601 |
| 2010/0315983 A1* | 12/2010 | Choi | | H04W 52/0251 |
| | | | | 370/311 |
| 2011/0286504 A1* | 11/2011 | Wang | | G06F 1/3203 |
| | | | | 375/222 |
| 2012/0077464 A1 | 3/2012 | Nair et al. | | |
| 2013/0250337 A1* | 9/2013 | Inoue | | H04N 1/00896 |
| | | | | 358/1.13 |
| 2014/0029496 A1* | 1/2014 | Ise | | H04W 52/0225 |
| | | | | 370/311 |
| 2014/0112225 A1* | 4/2014 | Jafarian | | H04W 52/0235 |
| | | | | 370/311 |
| 2014/0195836 A1* | 7/2014 | Tiedemann | | H04W 52/0229 |
| | | | | 713/323 |

OTHER PUBLICATIONS

Zimmermann et al., "Making TCP More Robust to Long Connectivity Disruptions (TCP-LCD)", RFC 6069, Network Working Group, Dec. 2010, pp. 1-23.

"Slow start", Wikipedia, Retrieved on Apr. 28, 2017, Webpage available at : http://en.wikipedia.org/wiki/Slow-start.

Conta et al., "Internet Control Message Protocol (ICMPv6) for the Internet Protocol Version 6 (IPv6) Specification", RFC 4443, Network Working Group, Mar. 2006, pp. 1-24.

"Energy Efficient Data Filtering and Communication in Mobile Wireless Computing" The Advanced Computing Systems Association, Retrieved on May 18, 2017, Webpage available at : http://static.usenix.org/publications/library/proceedings/mob95/full_papers/imielinski.txt.

Agarwal et al., "Somniloquy: Maintaining Network ConnectivityWhile Your Computer Sleeps", Microsoft Research Tech Report, Mar. 1, 2008, 14 pages.

European Office Action received for corresponding European Patent Application No. 13770972.1, dated Jan. 18, 2017, 4 pages.

* cited by examiner

PROCESSOR SLEEP MODE COMMUNICATION HANDLING

RELATED APPLICATION

This application was originally filed as PCT Application No. PCT/IB2013/055711 filed Jul. 11, 2013.

BACKGROUND

Technical Field

The exemplary and non-limiting embodiments relate generally to handling of communications and, more particularly, to handling of communications when a processor is in a sleep mode.

Brief Description of Prior Developments

The Internet protocol suite is the networking model and a set of communications protocols used for the Internet and similar networks. It is commonly known as TCP/IP, because its most important protocols, the Transmission Control Protocol (TCP) and the Internet Protocol (IP) were the first networking protocols defined in this standard. TCP/IP provides end-to-end connectivity specifying how data should be formatted, addressed, transmitted, routed and received at the destination. TCP/IP (Transmission Control Protocol/Internet Protocol) is the basic communication language or protocol of the Internet. It can also be used as a communications protocol in a private network (either an intranet or an extranet). TCP/IP communication is primarily point-to-point, meaning each communication is from one point (or host) in the network to another point or host.

A WLAN (wireless local area network) chipset can either refer to a piece of hardware designed to allow a computer to connect to a wireless network, or it can refer to the chipboard located within the WLAN hardware unit. A technician building or designing a piece of WLAN hardware may call the internal chip board inside the hardware a WLAN chipset. Types of WLAN hardware units that may be commonly referred to as a WLAN chipset include wireless cards, routers, and wireless signal boosters. Conventional WLAN chipsets can selectively drop packets, based on predefined filters using IP addresses or any field of IP packet thereof. Conventional WLAN chipsets can reply automatically to Address Resolution Protocol (ARP) or IPv6 Neighbor Discovery (ND) requests.

SUMMARY

The following summary is merely intended to be exemplary. The summary is not intended to limit the scope of the claims.

In accordance with one aspect, an example method comprises determining when a processor of an apparatus is in a sleep mode; when the processor is determined to be in the sleep mode, and during a transport protocol session of the apparatus with a device, preventing an incoming transport packet of the transport protocol session from disturbing the sleep mode of the processor; and in response to the incoming transport packet, while the processor is in the sleep mode, transmitting an indication by the apparatus to the device.

In accordance with another aspect, an example embodiment is provided in an apparatus comprising a wireless communication chipset configured to: determine when a processor is in a sleep mode; when the processor is determined to be in the sleep mode, and during a transport protocol session with a device, prevent an incoming transport packet of the transport protocol session from disturbing the sleep mode of the processor; and in response to the incoming transport packet, while the processor is in the sleep mode, generate an indication to be sent to the device.

In accordance with another aspect, an example embodiment is provided in a non-transitory program storage device readable by a machine, tangibly embodying a program of instructions executable by the machine for performing operations, the operations comprising: determining when a processor is in a sleep mode; when the processor is determined to be in the sleep mode, and during a transport protocol session with a sending device, preventing an incoming transport packet of the transport protocol session from disturbing the sleep mode of the processor; and in response to the incoming transport packet while the processor is in the sleep mode, sending an indication to the sending device.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
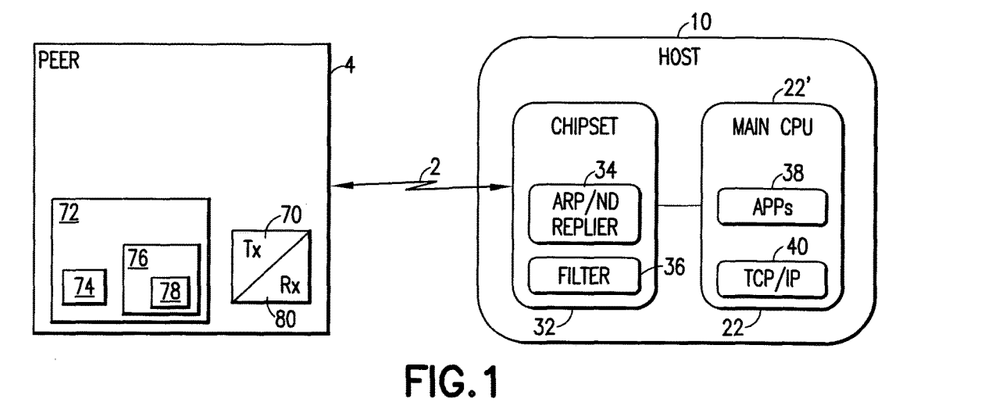
FIG. 1 is a diagram illustrating a link between a peer and an apparatus comprising an example embodiment.

Referring to FIG. 1, there is shown a diagram of a host apparatus 10 incorporating features of an example embodiment coupled by a link 2 to a device 4. The link 2 includes a wireless communication link, such as a WLAN for example. Although the features will be described with reference to the example embodiments shown in the drawings, it should be understood that features can be embodied in many alternate forms of embodiments. In addition, any suitable size, shape or type of elements or materials could be used.

The device 4 may be an Internet peer for example. The link 2 at least partially includes a WLAN coupled to the host 10 for example. WLAN is used here as the main use-case. However, this is merely an example. Features as described herein are not limited to WLAN. Other radios might benefit from the features as described herein.

Figure 2:
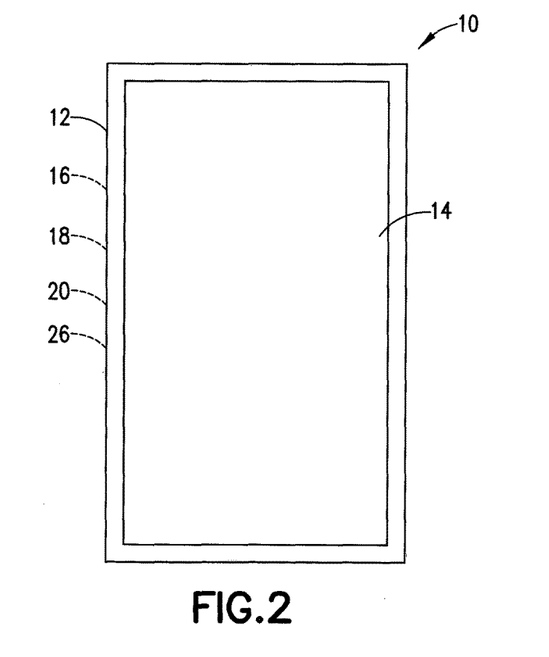
FIG. 2 is a front view of the example embodiment shown in FIG. 1.

Referring also to FIG. 2, the apparatus 10 may be a hand-held communications device which includes a telephone application. The apparatus 10 may additionally or alternatively comprise an Internet browser application, camera application, video recorder application, music player and recorder application, email application, navigation application, gaming application, and/or any other suitable electronic device application. Referring to both FIGS. 1-3, the apparatus 10, in this example embodiment, comprises a housing 12, a display 14, a receiver 16, a transmitter 18, a rechargeable battery 26, and a controller 20 which can include at least one processor 22, at least one memory 24, and software 28. However, all of these features are not necessary to implement the features described below. The display 14 in this example is a capacitive touchscreen display which functions as both a display screen and as a user input. The user interface may also include a keypad or other user input device. The electronic circuitry inside the housing 12 may comprise a printed wiring board (PWB) having components such as the controller 20 thereon. The circuitry may include a sound transducer provided as a microphone and a one or more sound transducers provided as an earpiece and/or speaker.

Figure 3:
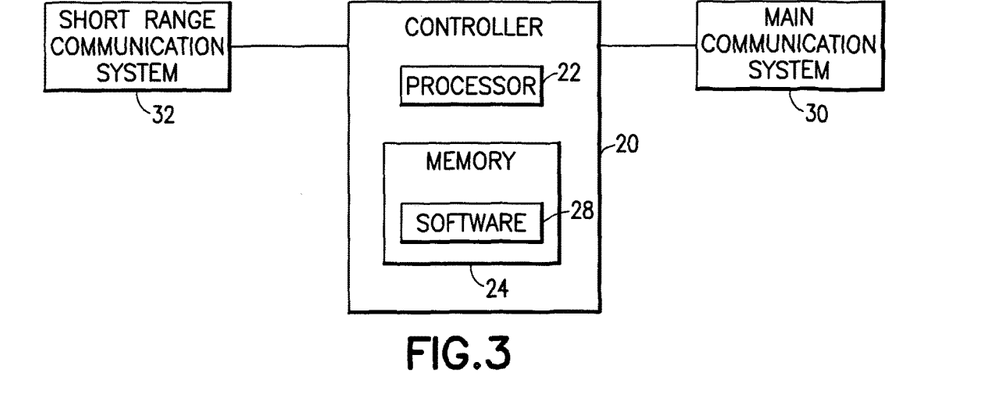
FIG. 3 is a diagram illustrating some of the components of the apparatus shown in FIG. 2.

The receiver 16 and transmitter 18 form a primary communication system 30 to allow the apparatus 10 to communicate with a wireless telephone system, such as a mobile telephone base station for example. As shown in FIG. 3, in addition to the primary communications system 30, the apparatus 10 may also comprise one or more short range communication systems 32. The short range communication system 32 comprises an antenna, a transmitter and a receiver for wireless radio frequency communications. Examples of the short range communication system 30 include Wi-Fi connecting to a wireless local area network (WLAN) for example. The short range communication system 32 in this example comprises a WLAN or Wi-Fi chipset as shown in FIG. 1. In the example shown the chipset comprises an Address Resolution Protocol/Neighbor Discovery (ARP/ND) replier 34 and a filter feature 36. The filtering feature 36 may include modules for packet filtering. The at least one processor 22 includes a main central processing unit (CPU) 22' which is able to process Apps 38 and a TCP/IP communication control feature 40. While features are described herein with reference to using TCP (Transmission Control Protocol), features as described herein may be used with other types of transport protocols. For example, features as described herein may be used with User Datagram Protocol (UDP), Stream Control Transmission Protocol (SCTP), Datagram Congestion Control Protocol (DCCP), and Internet Control Message Protocol (ICMP). Please note that these are merely examples.

Features as described herein may be used with traditional Transmission Control Protocol (TCP) performance topics. Features as described herein may also be used with modern technologies when a main central processing unit (CPU) 22' and/or a mobile application processor, such as in a mobile handset for example, is in a sleep mode while letting a Wireless Local Area Network (WLAN) chipset 32 to stay active and attached to the WLAN. This may be done with features for filtering IP packets away and, thus, helping the CPU to stay sleep and not to wake up to handle unwanted packets. The purpose of such sleep modes is battery saving.

The WLAN chipset 32 may answer to IPv4 ARP and IPv6 ND requests on behalf of TCP/IP stack 40 in the CPU 22'. The WLAN chipset 32 may drop packets based on statically or dynamically defined filters such as based on destination addresses or protocol field values for example.

In some situations a processor of a host may go to sleep, or wish to go sleep, in a variable length sleep mode. This may occur during an active transport session. Of course, allowing a processor to go to sleep would occur when the processor is not involved with an active TCP transport session. In the past, if the processor were to go to sleep during an active TCP transport session, the TCP session would be ungracefully disconnected from the peer, and the peer would not get any detailed indication explaining that the processor went to sleep. The TCP session would subsequently be gracefully, but unwantedly terminated. Thus, in the past, the processor was not able to go to sleep while the TCP session was active. In the past, if the processor did go to sleep while the TCP session was active, the peer would not understand why packets sent to the host disappeared without response; the packets being silently dropped. In the case of packets being lost due to short sleeps (and the sender/peer not getting an TCP ACK message), the sender would handle the situation as traffic congestion and drop transmission speeds before eventually dropping the whole session. The sleep situation, thus, would have been handled erroneously as congestion.

A beneficial feature as described herein is the ability for a processor to go to sleep while indicating in an ongoing TCP session that the processor is at sleep. This indication could then inform a peer that there is no congestion, and that the session has not been lost. Furthermore, for peers that try to initiate connection while the processor is asleep, a beneficial feature as described herein is the ability to indicate that the processor is in a sleep mode, and the apparatus will (probably) be operational soon. These features are new and help conserve battery power by allowing the processor to go into a sleep mode and stay in a sleep more even during TCP transmission sessions.

Features as described herein may be provided in a WLAN chipset 32 which is configured to automatically indicate to one or more senders/peers that the destination (the host) is unreachable due to sleep. This feature may be provided with a new code, such as a new Internet Control Message Protocol version 6 (ICMPv6) code. This may use the capability to build ICMPv6 messages at the WiFi chipset 32. However, that is a very simple procedure to do. The automatic indication may be limited to only a select sender(s) or peer(s); not necessarily required for all senders/peers.

Figure 4:
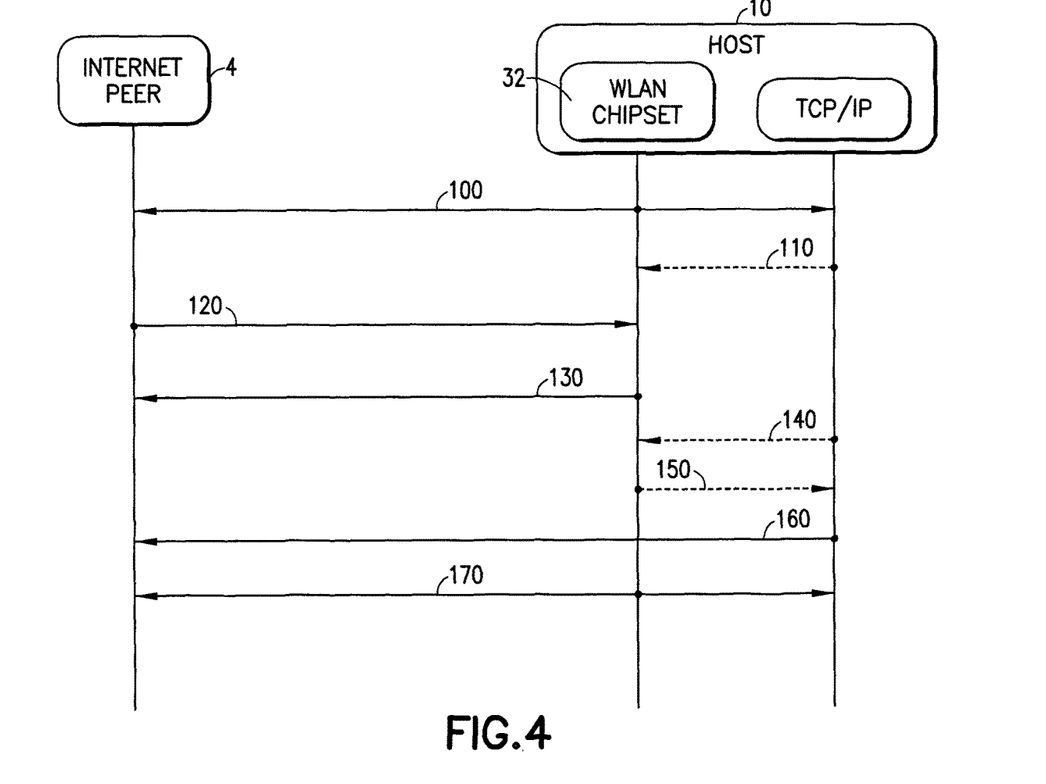
FIG. 4 is a diagram illustrating some steps of an example method.

FIG. 4 illustrates where the host 10 enters a sleep mode and the WLAN chipset 32 indicates to a peer 4, such as with an ICMPv6 message for example, that the host is asleep at the moment. In FIG. 4 the host 10 is having an active TCP session with the peer 4 in the Internet at step 100. At step 110 the host's CPU (ref FIG. 1) goes into sleep and the TCP/IP stack indicates to the WLAN chipset that the CPU is going to sleep, and that the WLAN should reply with ICMPv6 sleep indication to the peer if it communicates anything. At step 120 the peer 4 sends a TCP packet, for which the WLAN chipset 32 replies with ICMPv6 sleep at step 130. The peer 4 now knows the host is at sleep. At step 140 the host's CPU 22' wakes up, and informs the WLAN chipset 32 to stop sending the ICMPv6 sleep messages. At step 150 the WLAN chipset indicates to TCP/IP stack 40 that the peer 4 tried to communicate during sleep, but was notified with ICMPv6. At step 160 the host TCP/IP stack 40 sends a message to peer 4 (such as TCP ACKnowledgement) that it is now active again, after which the peer 4 can (re)transmit data to host again at step 170.

Effectively the chipset 32 may put the other node's TCP into a situational awareness by using a new ICMPv6 cause code explicitly indicating sleep mode. The ICMPv6 message may be generated by the radio of the host similar to a conventional automatic ARP reply. To avoid replying the ICMPv6 Sleep indication to all senders, and thus consuming battery in sending and also providing proof of node existence to possible attackers, the host operating system (TCP/IP stack 40) could configure (such as per peer, port, protocol or address for example) when the WLAN chipset shall reply with the ICMPv6 sleep message (or when simply to drop the packets, or forward the packet to the TCP/IP stack similar to a conventional WLAN filter). For example, the WLAN chipset 32 may be configured to drop packets by default, reply with ICMPv6 sleep for messages arriving from low priority peers (related to low priority transport sessions), and when to forward IP packets known to belong to high priority channels to the processor 22' (such as notification channels used by Nokia/Microsoft) to wake up the processor.

The sleep message could alternatively or additionally be proactively generated by the host's TCP/IP stack if it knows it is going to sleep, and does not want to disconnect ongoing sessions, but nonetheless wants to inform peer(s) that sleep is happening.

Figure 5:
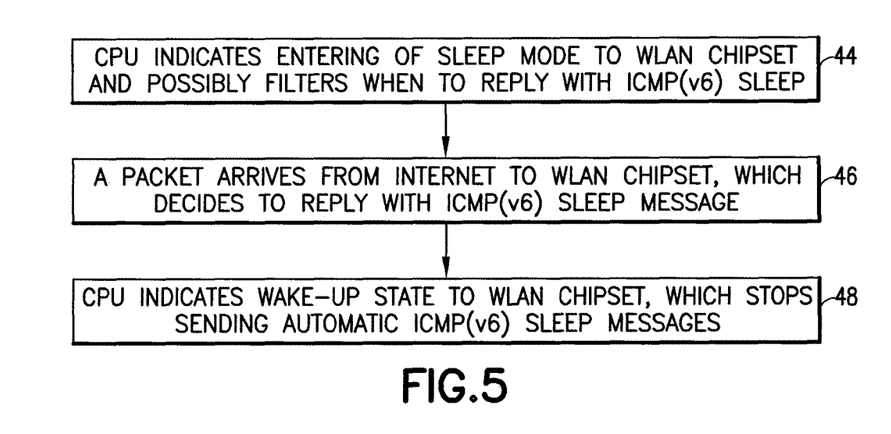
FIG. 5 is a diagram illustrating some steps of an example method.

FIG. 5 is a diagram showing how the CPU enters sleep and the WLAN starts responding with ICMPv6 Sleep messages. As indicated by block 44 the CPU may indicate that it is entering a sleep mode to the WLAN chipset and that the WLAN may possible filter when to reply with a sleep indication message, such as a ICMPv6 sleep indication message in this example. As indicated by block 46 when a packet arrives from the Internet to the WLAN chipset, the WLAN chipset may decide to reply with the sleep indication message. As indicated by block 48, the CPU may subsequently indicate to the WLAN chipset that the CPU is now awake, and the WLAN chipset may thus stop sending automatic sleep indication messages.

Figure 6:
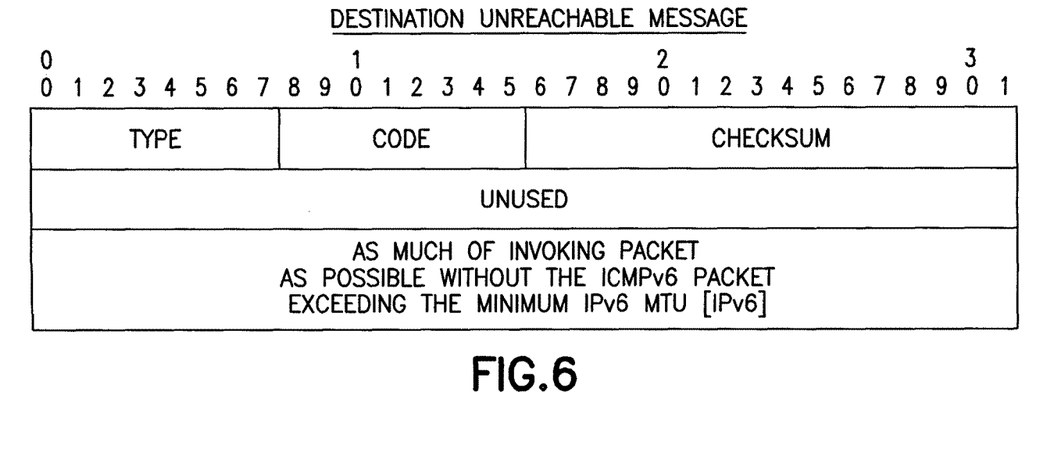
FIG. 6 is an example of a destination unreachable message.

Referring also to FIG. 6, a new status code (8 in this example because it is next free in IRNA registry http://www.iana.org/assignments/icmpv6-parameters/icmpv6-parameters.xml) may be added to ICMPv6, with ICMPv6 shown herein added to a RFC4443 specified message format, where:

Code 0—No route to destination
    1—Communication with destination administratively prohibited
    2—Beyond scope of source address
    3—Address unreachable
    4—Port unreachable
    5—Source address failed ingress/egress policy
    6—Reject route to destination
    8—Destination at sleep If the duration of the sleep is known, the ICMPv6 reply may include a field describing when the host should be reachable again. This would require more changes to the ICMPv6. In some example embodiments the sleep message might be something other than a ICMPv6 message. For example, a TCP option might be created to proactively indicate entry to a sleep mode. In one example a dedicated protocol could be used. The example description above uses the example of ICMPv6 because it may be easier to deploy and standardize than others.

A TCP of the peer 4 that gets this kind of sleep indication could slow down unnecessary retransmission a lot, and retransmit after a much longer period to see whether the destination 10 is still at sleep, or if a hard error is received instead. If the sleepy node 10 sends an ACK after waking up, full speed transmissions could commence right away. A TCP socket programming interface of the peer 4 could indicate to the application that the TCP is experiencing a peer sleep situation, and hence allow the application to increase user timeout, disconnect, or do something else suitable for a given application (e.g. show to user peer to be asleep).

The WLAN chipset 32 may have an Application Programming Interface (API) that can be used to set the automatic ICMPv6 replying system. Basically the API may have means for communicating information needed in building an ICMPv6 message—such as source IP(v6) address of the host, and possibly also filter when to send ICMPv6 messages. E.g. API could look like this abstract example herein:

<api-call> <action> <action type> <protocol> <port>
    wlan-control add ICMPv6-Sleep-Reply TCP 12345

The above example would instruct WLAN to add a filter to look at packets going to TCP port 12345 and reply to those with ICMPv6 Sleep. The implementation to API can take many shapes and forms, and have different set of filters and communicated in different ways (such as abstract names as here, but also bitmasks, bitfields, and alike).

Figure 7:
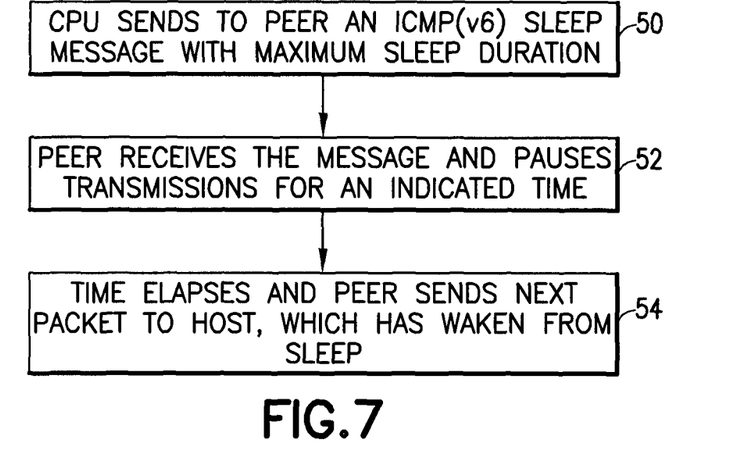
FIG. 7 is a diagram illustrating some steps of an example method.

A diagram at FIG. 7 shows how the TCP/IP stack in CPU proactively sends ICMPv6 sleep messages as an indication of going to sleep. As indicated in block 50 the CPU may send to the peer a sleep indication message, such as in ICMPv6 for example, which indicates a maximum sleep duration. As indicate in block 52, the peer may receive the message and pause transmission for an indicated time. As indicated by block 54, after the time has elapsed the peer may send the next packet to the host, where the host has awoke from sleep.

The apparatus may have (shortish) sleeps without severely affecting TCP performance. Transmission could continue fast after wakeup. Applications may give better error messages to a user or have wiser retry algorithms: the sleep is a soft error when considered to more serious destination unreachable errors. TCP slow start avoidance due to sleep may be provided. The TCP would not think ACK is missing due to congestion, but would understand it is because of sleep. A new status code may make the TCP behavior more explicit than attempting to guess what the situation is based on current destination unreachable messages.

Modem

For a modem, instead of a wireless chipset of WLAN chipset, the modem could store packets for which it has auto-replied with an ICMPv6 sleep message. However, this is not necessary. In the case where the modem stored packets, for which it had auto-replied with an ICMPv6 sleep message, the modem may forward the buffered packets to the TCP/IP stack 40 after the processor 22' wakes up. This may be forwarded with a possible indication that for these packets an ICMPv6 Sleep was auto-replied.

The modem could inform the TCP/IP stack, after the processor 22' has woken up, which peers the ICMPv6 sleep was indicated to. This may allow the TCP/IP stack to take actions, such as notifying the peer(s) that the processor/apparatus is now awake for example. There are different ways for this notification. For example, the notification may be by sending a duplicate TCP ACK, but also the application layer protocols could take actions such as doing polls or sending application layer notifications to peer(s).

Router

Figure 8:
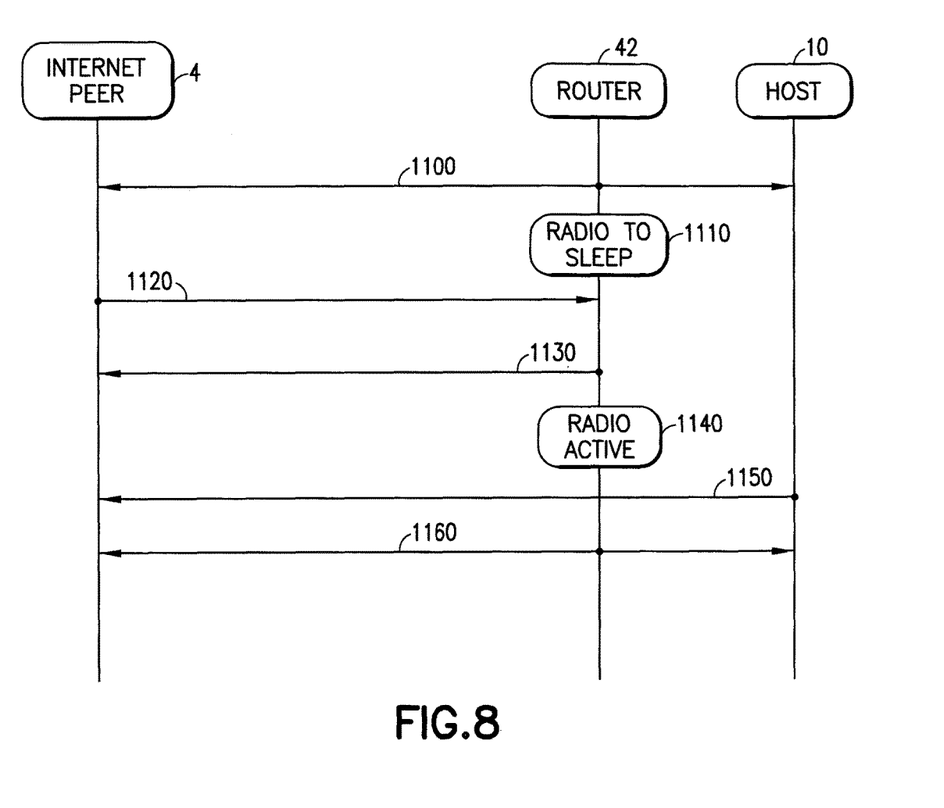
FIG. 8 is a diagram illustrating some steps of an example method.

In one example, features may be provided in a router. FIG. 8 illustrates a router 42 being aware of radio sleep mode and sending ICMPv6 sleep indications to nodes 4 in the Internet attempting to send messages to the host. The router may be informed by the host such that the router knows that the host is in a sleep mode and, hence, cannot receive packets at the current time. In a conventional router there is no way the router can indicate this for the sending device. Thus, the sleep message could alternatively or additionally be generated by a router that knows a destination host is in a sleep mode (or rather that the radio link between router and host is at a power save/sleep mode).

In FIG. 8 at step 1100 the host 10 is having an active TCP session with the peer 4 in the Internet. The communications go through the router 42, which has awareness of radio link status between the router and the host. At step 1110 the radio goes to longish sleep, such as due to a long duty cycle or due radio level sleep possibly initiated by the host for example. The longish sleep means a sleep longer than what it is feasible to buffer data packets coming from the Internet peer. For short sleep modes the router would just buffer packets as it does today in a conventional router. At step 1120 the Internet peer 4 sends a packet destined to the host 10. As the host was known to be in (longish) sleep, the router sends ICMPv6 sleep indication to the Internet peer at step 1130. At step 1140 the radio becomes active again. At step 1150 the host sends packet (such as a duplicate TCP ACK for example) to Internet peer 4 as the host 10 knows it has waken up from radio sleep mode and the peer might have something to send, and henceforth at step 1160 the Internet peer sends data again.

Figure 9:
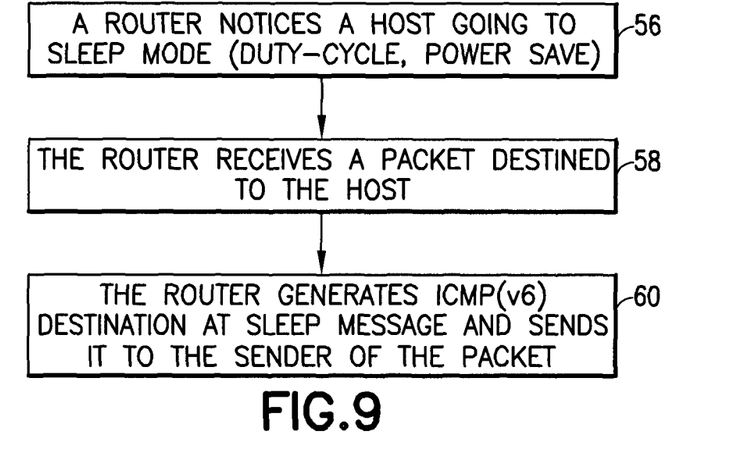
FIG. 9 is a diagram illustrating some steps of an example method.

A diagram at FIG. 9 shows how the router sends ICMPv6 sleep messages when knowing host to be at sleep phase. As indicated by block 56, the router may notice that a host is going to sleep or has gone to sleep. As indicated by block 58, the router 42 may receive a packet destined for the host 10. As indicated by block 60 the router 42 may generate a destination at sleep message (such as an ICMPv6 message in this example) and sends the message to the sender of the packet. Please note that these are only examples and should not be considered as limiting. The actual behavior of the device for setting up the WLAN chipset to decide when to send an ICMPv6 message may be implementation specific.

An example method may comprise determining when a processor of an apparatus is in a sleep mode; when the processor is determined to be in the sleep mode, and during a Transmission Control Protocol (TCP) session of the apparatus with a device, preventing an incoming TCP packet of the TCP session from disturbing the sleep mode of the processor; and in response to the incoming TCP packet, while the processor is in the sleep mode, transmitting an indication by the apparatus to the device. As used herein "during" a Transmission Control Protocol (TCP) session or "during" a transport protocol session includes during an ongoing session and at the start of a new transport protocol session. "During" is not limited to only an ongoing session and, thus, features are not limited to a transport protocol session setup before a sleep mode occurs. The transport protocol session may be set up after the sleep mode is started and the apparatus and method may prevent the incoming TCP packet of the new TCP session from disturbing the sleep mode of the processor.

Determining when the processor is in the sleep mode may comprise the processor sending a signal that the processor is going to sleep. Determining when the processor is in the sleep mode may comprise a wireless communication chipset of the apparatus receiving the signal. A wireless communication chipset of the apparatus may prevent the incoming TCP packet of the TCP session from disturbing the sleep mode of the processor. A wireless communication chipset of the apparatus may generate the indication to be transmitted to the device. The indication may indicates that the processor is in a sleep mode. The indication may be in a destination unreachable message transmitted to the device from the apparatus. The method may further comprise determining when to stop transmitting the indication by the apparatus based upon the processor no longer being in the sleep mode. The method may further comprise signaling the processor when the processor is no longer in the sleep mode that the device sent the TCP packet while the processor was asleep. The method may further comprise, based on the signaling to the processor that the device sent the TCP packet while the processor was asleep, transmitting a message to the device that the processor is no longer asleep.

An example may be provided in an apparatus comprising a wireless communication chipset configured to: determine when a processor is in a sleep mode; when the processor is determined to be in the sleep mode, and during a transport protocol session with a device, prevent an incoming transport packet of the transport protocol session from disturbing the sleep mode of the processor; and in response to the incoming transport packet, while the processor is in the sleep mode, generate an indication to be sent to the device. The transport protocol may be TCP, UDP, SCTP, DCCP, ICMP for example.

The wireless communication chipset may be configured to determine when the processor is in the sleep mode based upon receiving a signal from the processor that the processor is going to sleep. The wireless communication chipset may be configured to generate the indication to be transmitted to the device. The indication may indicate that the processor is in the sleep mode. The indication may be in a destination unreachable message transmitted to the device from the apparatus. The wireless communication chipset may be configured to determine when to stop transmitting the indication based upon the processor no longer being in the sleep mode. The wireless communication chipset may be configured to signal the processor, when the processor is no longer in the sleep mode, that the device sent the TCP packet while the processor was asleep. The apparatus may be configured to, based on the signal to the processor that the device sent the TCP packet while the processor was asleep, transmit a message to the device that the processor is no longer asleep. The apparatus may further comprise at least one printed wiring board comprising: the processor; a memory connected to the processor, where the memory comprises software code; a wireless transmitter; a wireless receiver; an electronic display connected to the at least one printed wiring board; a battery connected to the at least one printed wiring board; and a housing which houses the at least one printed wiring board, where the apparatus is a portable electronic apparatus. The apparatus may comprise means for conserving battery power of a battery of the apparatus comprising means for preventing the incoming TCP packet of the TCP session from disturbing the sleep mode of the processor and for generating the indication to be sent to the sending device.

An example embodiment comprises a non-transitory program storage device readable by a machine, tangibly embodying a program of instructions executable by the machine for performing operations, the operations comprising: determining when a processor is in a sleep mode; when the processor is determined to be in the sleep mode, and during a Transmission Control Protocol (TCP) session with a sending device, preventing an incoming TCP packet of the TCP session from disturbing the sleep mode of the processor; and in response to the incoming TCP packet while the processor is in the sleep mode, sending an indication to the sending device.

An example method comprises sending a transport packet of a transport protocol session from a device 4 towards an apparatus 10; and receiving an indication 130 from the apparatus 10 by the device 4 which indicates that a processor of the apparatus is asleep, where the indication is in a destination unreachable message from the apparatus. Based upon receiving the indication, the method may comprise the device not attempting to send the transport packet again until a predetermined event occurs. The predetermined event may be an expiration of a predetermined amount of time for example. The predetermined event may be the device receiving a message from the apparatus that the processor is no longer asleep for example.

Referring back to FIG. 1, an example embodiment may be provided in a device 4 comprising means for sending a transport packet of a transport protocol session from a device towards an apparatus, such as the transmitter 70 and controller 72 comprising a processor 74 and memory 76 having software 78; means for receiving an indication from the apparatus by the device, such as receiver 80, which indicates that a processor of the apparatus is asleep, where the indication is in a destination unreachable message from the apparatus; and means, based upon receiving the indication, for preventing the device from attempting to send the transport packet again until a predetermined event occurs, such as controller 72 for example.

Another example embodiment may be provided in non-transitory program storage device readable by a machine, such as memory 76 for example, tangibly embodying a program of instructions executable by the machine for performing operations, the operations comprising: sending a transport packet of a transport protocol session from a device towards an apparatus; receiving an indication from the apparatus by the device which indicates that a processor of the apparatus is asleep, where the indication is in a destination unreachable message from the apparatus; and based upon receiving the indication, preventing the device from attempting to send the transport packet again until a predetermined event occurs.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   receiving, at a first apparatus, an incoming transport packet from a second apparatus, the incoming transport packet being received during a transport protocol session between the first apparatus and the second apparatus, and the incoming transport packet being received while a processor of the first apparatus is in a sleep mode;
   in response to receiving the incoming transport packet while the processor of the first apparatus is in the sleep mode, responding to the incoming transport packet by at least a transmission, to the second apparatus, of an indication that the first apparatus is in the sleep mode and that the second apparatus is to cease a sending of transport packets to the first apparatus; and
   in response to determining that the processor is no longer in the sleep mode, sending, to the second apparatus, another indication that the first apparatus is no longer in the sleep mode and that the second apparatus is to resume the sending of transport packets to the first apparatus.

2. A method as in claim 1, further comprising determining that the processor is in the sleep mode based at least on a signal from the processor, the signal indicating that the processor is entering the sleep mode.

3. A method as in claim 1, wherein the incoming transport packet of the transport protocol session is prevented from disturbing the sleep mode of the processor.

4. A method as in claim 1, wherein the indication is included in a destination unreachable message transmitted to the second apparatus from the first apparatus.

5. A method as in claim 1, further comprising determining when to stop transmitting, to the second apparatus, the indication based at least on the processor no longer being in the sleep mode.

6. A method as in claim 1, further comprising:
   in response to determining that the processor is no longer in the sleep mode, sending, to the processor, a signal indicating that the second apparatus sent the incoming transport packet while the processor was in the sleep mode.

7. An apparatus comprising:
   at least one processor;
   at least one memory storing instructions which, when executed by the at least one processor, cause the apparatus to at least:
   receive, at the apparatus, an incoming transport packet from another apparatus, the incoming transport packet being received during a transport protocol session between the apparatus and the other apparatus, and the incoming transport packet being received while a processor of the apparatus is in a sleep mode;
   in response to receiving the incoming transport packet while the processor of the apparatus is in the sleep mode, respond to the incoming transport packet by at least a transmission, to the other apparatus, of an indication that the processor of the apparatus is in the sleep mode and that the other apparatus is to cease a sending of the transport packets to the apparatus; and
   in response to a determination that the processor of the apparatus is no longer in the sleep mode, sending, to the other apparatus, another indication that the processor of the apparatus is no longer in the sleep mode and that the other apparatus is to resume the sending of transport packets to the apparatus.

8. An apparatus as in claim 7, wherein the apparatus is further caused to at least:
   determine that the processor of the apparatus is in the sleep mode based at least on a signal from the processor, the signal indicating that the processor is entering the sleep mode.

9. An apparatus as in claim 7, wherein the apparatus is further caused to at least:
   generate the indication transmitted to the other apparatus.

10. An apparatus as in claim 7, wherein the indication is included in a destination unreachable message transmitted to the other apparatus from the apparatus.

11. An apparatus as in claim 7, wherein the apparatus is further caused to at least:
    stop transmission of the indication based at least on the processor of the apparatus no longer being in the sleep mode.

12. An apparatus as in claim 7, wherein the apparatus is further caused to:
    in response to a determination that the processor of the apparatus is no longer in the sleep mode, send, to the processor, a signal indicating that the other apparatus sent the incoming transport packet while the processor was in the sleep mode.

13. An apparatus comprising:
    at least one processor;
    at least one memory storing a program of instructions;

wherein the at least one memory storing the program of instructions is configured, with the at least one processor, to cause the apparatus to at least:

send, to another apparatus, a transport packet, the transport packet being sent during a transport protocol session between the apparatus and the other apparatus;

receive an indication that a processor of the other apparatus is in a sleep mode, the indication being included in a destination unreachable message;

in response to receiving the indication that the processor of the other apparatus is in the sleep mode, cease a sending of transport packets to the other apparatus; and in response to receiving another indication that the processor of the other apparatus is no longer in the sleep mode, resume the sending of transport packets to the other apparatus.

14. An apparatus as in claim 13, wherein the transport packet is prevented from being sent again until a predetermined event occurs.

15. An apparatus as in claim 14, wherein the predetermined event comprises an expiration of a predetermined amount of time.

16. An apparatus as in claim 14, wherein the predetermined event comprises the apparatus receiving the other indication that the processor of the other apparatus is no longer in the sleep mode.

* * * * *

UNITED STATES PATENT AND TRADEMARK OFFICE
CERTIFICATE OF CORRECTION

PATENT NO. : 9,967,777 B2  
APPLICATION NO. : 14/900278  
DATED : May 8, 2018  
INVENTOR(S) : Teemu Ilmari Savolainen

Page 1 of 1

It is certified that error appears in the above-identified patent and that said Letters Patent is hereby corrected as shown below:

In the Claims

At Column 10, Claim number 7, Line number 34, should read:
"apparatus is no longer in the sleep mode, send, to"

Signed and Sealed this
Eighteenth Day of June, 2019

Andrei Iancu
*Director of the United States Patent and Trademark Office*